United States Patent
Swander et al.

(10) Patent No.: US 7,509,673 B2
(45) Date of Patent: Mar. 24, 2009

(54) MULTI-LAYERED FIREWALL ARCHITECTURE

(75) Inventors: Brian D. Swander, Bellevue, WA (US); Paul G. Mayfield, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 10/456,766

(22) Filed: Jun. 6, 2003

(65) Prior Publication Data

US 2005/0022010 A1 Jan. 27, 2005

(51) Int. Cl.
G06F 21/20 (2006.01)
(52) U.S. Cl. .......................... 726/11; 713/152
(58) Field of Classification Search ............... 713/152; 726/11
See application file for complete search history.

(56) References Cited

U.S. PATENT DOCUMENTS

| | | | | |
|---|---|---|---|---|
| 5,968,176 A * | 10/1999 | Nessett et al. ............ | 726/11 |
| 5,987,611 A * | 11/1999 | Freund ...................... | 726/4 |
| 6,003,084 A | 12/1999 | Green et al. | |
| 6,009,475 A * | 12/1999 | Shrader ..................... | 709/249 |
| 6,092,110 A * | 7/2000 | Maria et al. ............... | 709/225 |
| 6,131,163 A * | 10/2000 | Wiegel ...................... | 726/12 |
| 6,219,786 B1 * | 4/2001 | Cunningham et al. ..... | 713/152 |
| 7,024,460 B2 * | 4/2006 | Koopmas et al. .......... | 709/206 |
| 2002/0162026 A1 | 10/2002 | Neuman et al. | |
| 2003/0084331 A1 | 5/2003 | Dixon et al. | |
| 2004/0250131 A1 | 12/2004 | Swander et al. | |
| 2005/0005165 A1 | 1/2005 | Morgan et al. | |
| 2005/0010765 A1 | 1/2005 | Swander et al. | |
| 2005/0022011 A1 | 1/2005 | Swander et al. | |

OTHER PUBLICATIONS

Abhishek Vagish et al., NT 5.1 IPSecurity Security Policy Database, Microsoft Corporation, 1999.

* cited by examiner

*Primary Examiner*—Gilberto Barron, Jr.
*Assistant Examiner*—Devin Almeida
(74) *Attorney, Agent, or Firm*—Wolf, Greenfield & Sacks, P.C.

(57) ABSTRACT

A method and system are provided for implementing a firewall architecture in a network device. The firewall architecture includes a plurality of network layers, a first firewall engine, and one or more callout modules. The layers send packets and packet information to the first firewall engine, maintain and pass packet context to subsequent layers, and process the packets. The first firewall engine compares the packet information to one or more installed filters and returns an action to the layers indicating how to treat the packet. The callouts provide additional functionality such as intrusion detection, logging, and parental control features.

38 Claims, 8 Drawing Sheets

MULTI-LAYERED FIREWALL ARCHITECTURE

RELATED APPLICATIONS

The present application contains subject matter related to that of patent application "Multi-Layer Based Method for Implementing Network Firewalls," Ser. No. 10/456,770; "A Method and Framework for Integrating a Plurality of Network Policies," Ser. No. 10/456,093; and "Method for Managing Network Filter Based Policy," Ser. No. 10/456,433; filed on the same day as the present application, the disclosures of which are hereby expressly incorporated by reference.

TECHNICAL FIELD

This invention generally relates to computer systems and to network security. More particularly, this invention relates to a firewall architecture implemented in one or more network devices.

BACKGROUND OF THE INVENTION

Network protocols are designed to facilitate communication between network devices through an open exchange of data. While the open exchange of data greatly enhances the use of network devices to accomplish tasks, it also creates problems because network protocols are not designed for, and generally do not provide, network security. Computers coupled to both public and private networks, such as Local Area Networks (LANs), Wide Area Networks (WANs), intranets, and the Internet are susceptible to malicious attacks perpetrated by other network devices coupled either directly or indirectly to the network. Such malicious attacks include theft of data, Denial of Service (DOS) attacks, the proliferation of computer viruses, and the like. Other related issues arise when coupling computers to networks such as controlling access to undesirable or inappropriate web sites by children.

A firewall is a tool used to protect individual users, network devices, and networks in general, from malicious attacks, while also adding the ability to control the exchange of data over the network through implementation of a policy. The firewall implements the policy by examining network packets and determining, based on the examination, whether the packets should be permitted, or conversely blocked, from further traversing the network.

The policy implemented via the firewall is defined by one or more filters. Each filter includes filter parameters and an associated action. The filter parameters are used to identify network packets that are subject to the firewall policy and include information such as hardware addresses, e.g. Media Access Control (MAC) addresses, network addresses, e.g. Internet Protocol (IP) addresses, protocol type, e.g. Transport Control Protocol (TCP), port numbers, and the like. The action defines how packets with parameters that match the filter parameters should be treated. As a specific example, the filter includes as its parameters a Uniform Resource Locator (URL) address, e.g. "http://www.foo.com." The filter further associates the action of block, i.e. drop the packet, with that URL address. Whenever the firewall examines a packet and through that examination identifies the URL address "http://www.foo.com" as embedded in the packet, the firewall drops the packet thereby preventing it from traversing the network.

Network devices exchange data by sending and receiving packets through a network stack comprising a layered network architecture. While different network architecture models exist, most include at least an application layer, a transport layer, a network layer, and a link layer. Network packets traverse each layer sequentially and, as each layer is traversed, the packet is subject to processing. For outbound packets, the application layer processes data according to application protocols such as Hypertext Transfer Protocol (HTTP), File Transfer Protocol (FTP), and Simple Mail Transfer Protocol (SMTP) to name a few. Other layers, such as the network layer and the transport layer packetize the data by embedding it in TCP and IP headers. The layers perform reciprocal processing for inbound packets by, for example, parsing headers, unpacketizing data etc. The layered "stack" architecture and processing function performed by the layers results in a dynamic packet structure whereby packet content including the packet parameters change as the packet traverses the network protocol stack.

Firewalls examine packets at an inspection point located within the layered network stack. At one extreme, the inspection point is at the application layer. For example, the firewall is deployed as a Layered Service Provider (LSP). Packets at the application layer include the underlying data that will be transmitted to another network device or that has been received from another network device. Examining the packet at the application layer permits the firewall to identify application layer parameters, such as a URL address, and compare the application layer parameters to the filter parameters. However, other packet parameters such as IP addresses, port numbers, MAC addresses, and the like are not available because they have either not been added to outbound packets or have been parsed away from inbound packets.

At the other extreme, the firewall inspection point is implemented at lower levels of the network stack as an intermediate driver interposed between the link layer and the network layer. Packets at the lower levels of the network stack include a maximum number of parameters, e.g. interface numbers, MAC addresses, IP addresses, protocol type, ports, and payload data. Although the packets include such parameters, it does not follow that the parameters are readily identifiable. After the firewall receives the packet, the firewall needs to parse and interpret the relevant packet parameter for comparison with the filter parameters. Thus, both the layers in the network stack and the firewall perform redundant packet parsing and interpretation functions.

SUMMARY OF THE INVENTION

The present invention is directed towards a firewall architecture that permits application of firewall filters to network packets at all layers within a network stack. The architecture includes a set layer processors capable of processing layer parameters from a network packet. The layer parameters are parameters associated with the layer processor and include parameters that the layer processor parses from, adds to, or otherwise derives from the network packet. The layer processors are further capable of issuing classification requests that include the layer parameters.

The architecture also includes a first firewall engine comprising a layer interface, a set of installed filters, and a lookup component. The layer interface receives the layer parameters sent as part of the classification request. The first firewall engine lookup component uses the layer parameters to identify one or more matching filters from the set of installed filters. Each matching filter includes an action that instructs the layer processor whether to permit the packet to further traverse the network or whether to block the packet. The first firewall engine returns at least one action to the layer processor via the layer interface.

In an embodiment of the invention, the layer processors maintain packet context. The layer processor receives the packet context from a previous layer processor and sends the packet context to the first firewall engine. The lookup component in the first firewall engine uses the packet context in combination with the layer parameters to identify the one or more matching filters. The layer processor also modifies the packet context by adding the layer parameters and then sending the modified packet context to a next layer processor.

In another embodiment of the invention, one or more callouts are included as part of the firewall architecture. Each of the one or more callout modules provide added functionality (beyond permit and block) such as packet logging functions, Internet Protocol Security (IPSec) verification, and execution of parental controls. The callout module is executed on the packet when it is identified as the action in one of the matching filters.

In another embodiment of the invention, a second firewall engine is provided. The second firewall engine adds new filters into the set of installed filters via a management API. The second firewall engine also includes an instance of the first firewall engine, referred to as a filter module that replicates the services of the first firewall engine within the second firewall engine.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
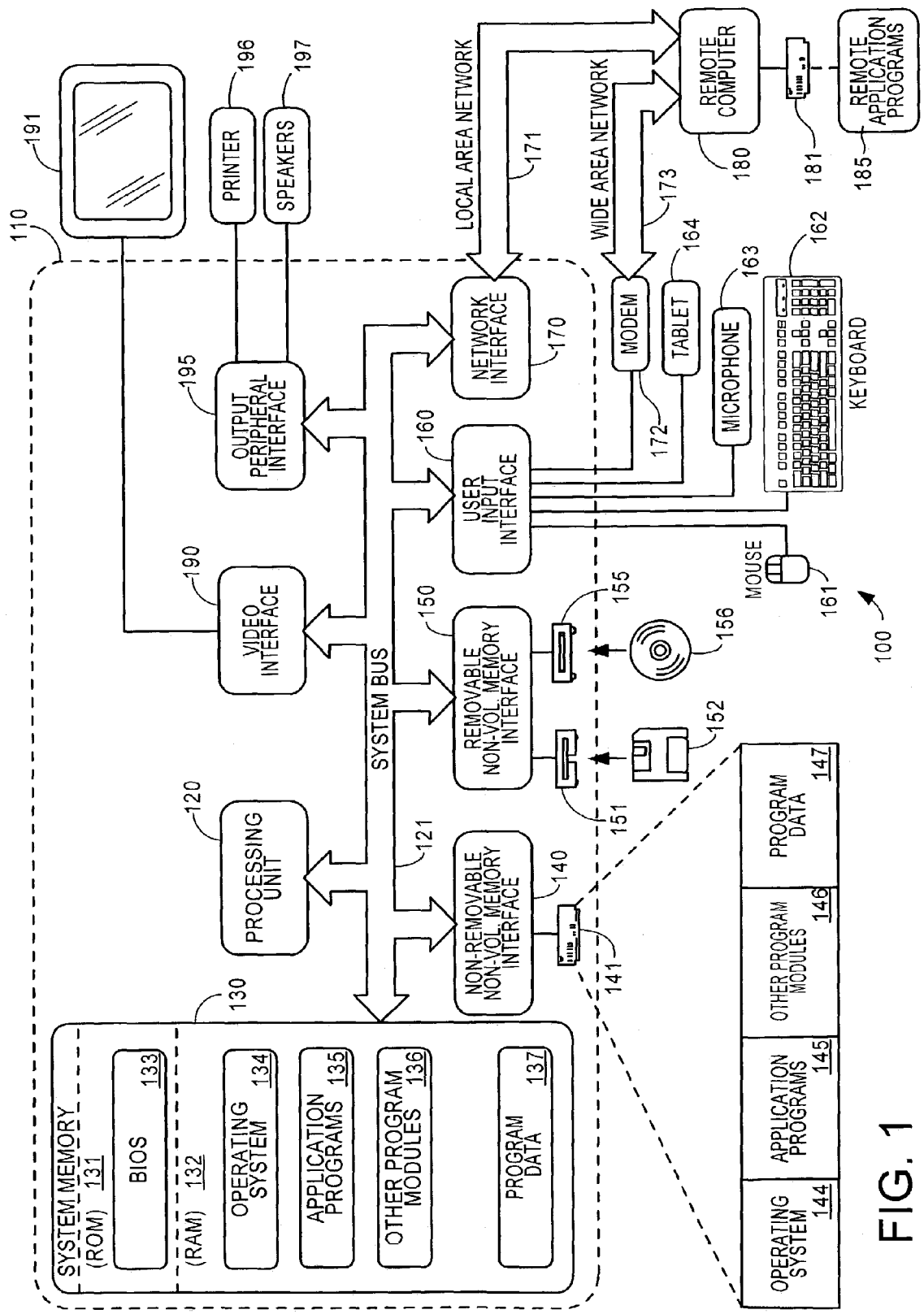
FIG. 1 is a block diagram generally illustrating an exemplary computer system on which the present invention resides.

A firewall architecture that permits filtering at multiple layer processes, referred to herein as layers, is disclosed. The architecture includes a user mode process and a kernel mode process executing in an operating system. Alternatively, the firewall architecture is executed outside of the operating system in one or more program modules or within a single operating system mode.

The kernel mode process includes a plurality of layers comprising a protocol stack, a kernel firewall engine, and one or more callouts. The protocol stack includes an application layer, a transport layer, a network layer, and link layer. Additional layers are added or deleted from the architecture as desired. The layers each form a requesting layer capable of receiving a network packet and corresponding packet context data from a previous layer or process. The requesting layer then issues a classification request to the kernel firewall engine via a layer API. The classification request includes the packet received by the requesting layer, the packet context, and a set of layer parameters associated with the requesting layer. The kernel firewall engine processes the request and returns an action. The action, by way of example, instructs the requesting layer how to treat the packet (e.g. permit or block). If the action is permit, the requesting layer processes the packet according to a layer protocol, modifies the packet context to include the layer parameters, and passes the packet and packet context to a next layer. If the action is block, the requesting layer drops the packet and does not pass the packet to the next layer. The requesting layer may perform additional functions as a result of the block action, such as tearing down a TCP connection where a TCP packet is dropped.

The kernel firewall engine includes the layer API, a set of installed filters, and a callout API. Each of the set of installed filters includes a set of filter conditions and an associated action. The kernel firewall engine processes the classification request sent from the requesting layer by identifying one or more matching filters. The matching filters have filter conditions that match the layer parameters and packet context. Once the matching filters are identified, they are applied in order of filter priority. If the action of the filter being applied is permit or block, the action is returned to the requesting layer. If the action is callout, the classification request issued by the requesting layer, along with matching filter identification, is passed to one of the callout modules. The callout module performs its programmed function, and returns an action to the kernel firewall engine.

The kernel firewall engine applies matching filters in order of priority to the packet until at least a terminating action is designated. Once the terminating action is designated, it is returned to the requesting layer and no additional matching filters are applied. If no matching filters are identified for a packet, the requesting layer is notified that no matching filters were found and the requesting layer then decides how to treat the packet. Typically, where no matching filter is identified, the requesting layer treats the packet as if a permit action was returned.

Exemplary user mode processes include a user mode firewall engine and one or more policy providers. The policy providers obtain policy from any suitable source such as volatile or non-volatile memory or is user entered through a graphical user interface or similar tool. The policy is a source of information for rendering a new filter, including the set of filter conditions and associated actions.

The user mode also includes an instance of the kernel firewall engine within the user firewall engine thereby permitting user mode layers to be created. The user mode layers then use the user mode instance of the kernel firewall engine to install filters, and identify filters that match a set of parameters allowing the application of filtering within the user mode.

In an embodiment of the invention, a callout interface from the firewall engine to a set of callout modules enables virtually unlimited extension of the firewall capabilities. By way of example, an HTTP context callout provides a parental control feature by identifying acceptable and unacceptable URL addresses. An IPSec callout verifies that packets that are supposed to use IPSec have been properly subject to IPSec processing. A logging callout logs packets meeting established criteria thereby facilitating later examination of packets. An intrusion detection callout identifies suspicious packets based on known algorithms.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 1 10. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
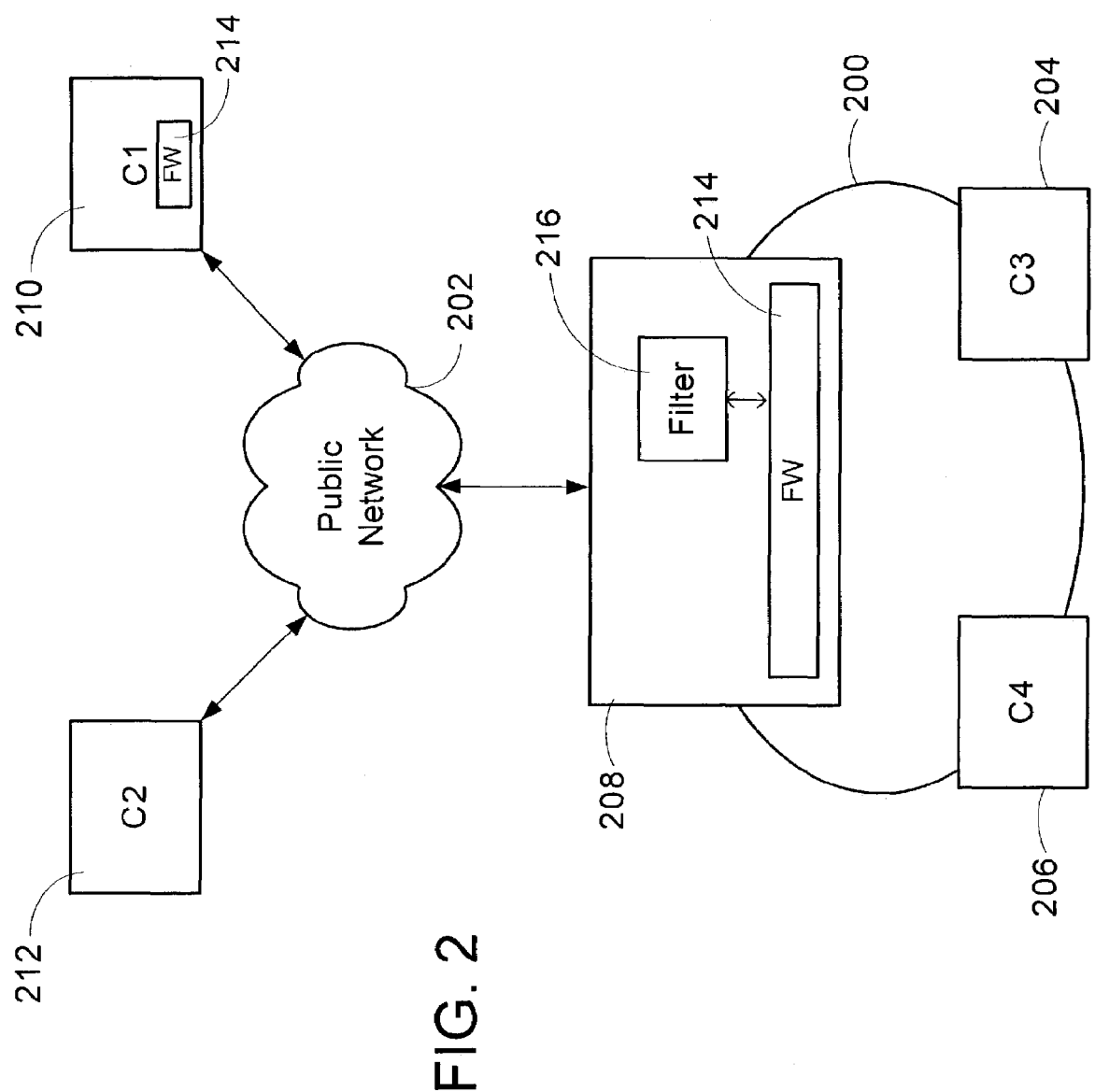
FIG. 2 is a block diagram generally illustrating an exemplary network environment whereby the present invention is employed.

A network environment wherein the firewall architecture of the present invention is used will now be described with reference to FIG. 2. The network is exemplary in nature as the firewall architecture of the present invention is implemented in any network device that is coupled to any network configuration. The network environment includes a private network 200 and a public network 202. The private network 200 and public network 202 are any suitable type such as Local Area Networks (LANs), Wide Area Networks (WANs), intranets, the Internet, or any combination thereof.

The network environment includes a plurality of network devices 204, 206, 208, 210 and 212. Network devices 204, 206 are coupled to the private network 200. Network devices 210, 212 are coupled to the public network 202. The network device 208 is coupled to, and provides an interface between, both the private network 200 and the public network 202. The network devices are coupled to the public and private networks using any suitable technology such as Ethernet, 1394, or 802.11(b). The network devices are further implemented as any suitable computing devices such as personal computers, servers, handheld devices, printers, switches, routers, bridges, repeaters or the like.

The network device 208 includes a firewall 214 and one or more filters 216. The firewall 214 is a program module or a set of program modules, implemented according to the architecture of the present invention, that examine network packets exchanged between the network devices 204, 206, 208 coupled to the private network 200 and the network devices 210, 212 coupled to the public network 202. In an embodiment of the invention, the firewall 214 also examines locally destined network packets sent from, and destined to, network devices within the private network 200.

The firewall 214 is implemented in network device 208 to protect and control network traffic exchanged between the private network 200 and the public network 202, referred to as an edge firewall. Alternatively, the firewall 214 is implemented in, and protects, a single network device such as illustrated in the network device 210, referred to as a host firewall. The firewall is also capable of being implemented as a centrally administered set of hosts and/or edge firewalls in a synchronized manner, referred to as a distributed firewall. Placement of the network device or devices implementing the firewall 214 is preferably selected such that the firewall 214 examines all network traffic destined for the network devices it is supposed to protect.

The filters 216 are implemented as part of the firewall 214. Alternatively, the filters 216 are implemented as part of a separate data structure accessible by the firewall 214. The firewall 214 and filters 216 execute a firewall policy designed to protect network devices 204, 206, 208 from malicious attacks originating from network devices 210, 212 coupled to the public network. The firewall 214 also provides added functionality such as facilitating parental controls, intrusion detection, logging of network packets, and other added filter based functionality.

Each filter 216 includes a set of filter conditions and one or more associated actions. The filter conditions include parameters and information that can be parsed or otherwise obtained from network packets such as interface numbers, hardware addresses, network addresses, protocol type, port numbers, and payload data. The one or more associated actions define how the network device implementing the firewall should treat packets that match the filter conditions. Typical actions include permit, i.e. allow the packet to continue network traversal, and block, i.e. preclude further network traversal by dropping packet.

The firewall 214 examines network packets traversing the network when received at network device 208 and, by comparing the packet parameters to the filter conditions, identifies one or more matching filters. A matching filter results when the filter conditions match the packet parameters. The packet parameters, like filter conditions, include information that is parsed or otherwise obtained from packets. When the firewall identifies a matching filter, the one or more actions associated with the filter conditions are executed.

Figure 3:
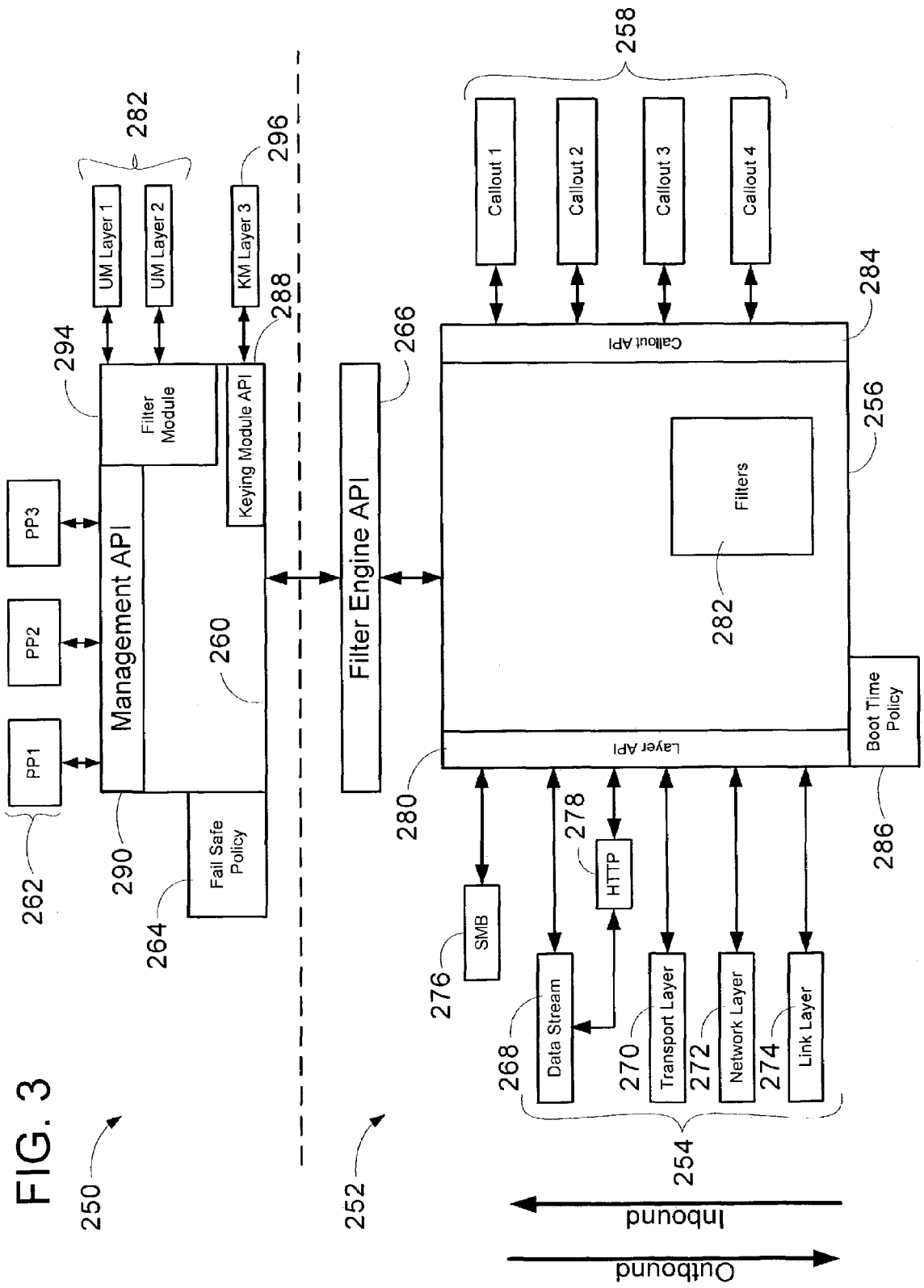
FIG. 3 is a block diagram generally illustrating the firewall architecture of the present invention.

FIG. 3 shows an overall view an embodiment of the firewall architecture of the present invention. The architecture provides the ability to subject packets to filters at all layers of a network stack. The firewall provides central management capabilities that allow filters to be added and deleted and for filter conflicts to be identified and resolved. The firewall architecture is extensible in that filter layers are added and deleted as needed and is expanded to include specialized functionality beyond permit and block actions. Although the invention is described with specific reference to firewalls and firewall filters, it is also used to facilitate and manage other filters and policies. As specific examples, the present invention is suitable for facilitating and managing filters used with Quality of Service (QOS), Internet Protocol Security (IPSec) suite, as well as other encrypting, authenticating, and key management protocols.

The firewall architecture includes a user mode process 250 and a kernel mode process 252. The user mode process 250 and kernel mode process 252 execute as part of an operating system in a network device. Those skilled in the art will appreciate that the user mode process 250 and the kernel mode process 252 of the operating system include additional components that for simplicity are not shown. Alternatively, the firewall architecture is executed in whole or in part outside of the operating system as one or more program modules or application programs or within a single operating system process.

The kernel mode process 252 includes a network stack 254, a first firewall engine referred to herein as a kernel firewall engine 256, and optional callouts 258. Collectively, the kernel mode process 252 implements an established firewall policy by identifying matching filters for network packets, processing packets according to known protocols, and executing other actions on the packet as designated by matching filters.

The network stack 254 comprises a plurality of layer processes, referred to herein as layers, including a data stream layer 268, a transport layer 270, a network layer 272, and a link layer 274. The firewall architecture of the present invention is extensible and additional layers are dynamically added and deleted as needed. An example of an added layer includes file access layer 276, implemented according to a Server Master Block (SMB) protocol. The layers may work in cooperation with other program modules such as a Hypertext Transfer Protocol (HTTP) parser module 278.

The layers in the network stack 254 process inbound and outbound network packets. Outbound network packets are packets being transmitted from the network device implementing the firewall architecture onto the network. Inbound packets are packets received at the network device implementing the firewall architecture. As indicated by the respective arrows shown in FIG. 3, inbound packets traverse the network stack 254 from bottom to top and outbound packets traverse the network stack 254 from top to bottom.

Network packets traverse, and are processed by, the network layers sequentially. In accordance with known techniques, each layer in the network stack 254 is capable of receiving packets from a previous layer or process, processing the packet according to a specification or protocol, and sending the processed packet to a next layer or process. In accordance with the invention, each layer in the network stack 254 also maintains packet context, passes the packet context to the next layer, issues a classification request to the kernel firewall engine 256, and takes action on the packet according to the firewall policy.

The packet context is a data structure that follows the packet from layer to layer. Each layer maintains the context by adding into the context data structure a set of parameters that the layer is designed to process, e.g. the information that the layer is designed to parse from inbound packets, add to outbound packets or otherwise derive from contents of packets. An exemplary data structure used for the packet context is described with reference to FIG. 5.

One of the operations carried out by the layers of the network stack 254 is to invoke the kernel firewall engine by issuing the classification request. The classification request is a call by a layer in the network stack 254 requesting that any filters that match the packet be identified and any associated action, e.g. permit or block, be returned to the layer. The layer issuing the classification request is referred to herein as a requesting layer. Each layer also takes the action on the packet that is returned by the kernel firewall engine 256.

The kernel firewall engine 256 includes a layer API 280, a set of installed filters 282, and a callout API 284. The kernel firewall engine 256 performs various functions including (1) maintaining the set of installed filters 282 defining the firewall policy, (2) receiving classification requests from the layers in the network stack 254, (3) identifying one or more matching filters based on the classification request, and (4) instructing the requesting layer of any action to take on the packet based on the matching filters.

Each filter of the set of installed filters includes a set of filter conditions and one or more associated actions. As described with reference to FIG. 2, the filter conditions identify the network packets that are subject to the associated filter action. The actions specified in the set of installed filters 282 include permit and block. Additional functionality is added via optional callouts 258. An exemplary form of the filters is described with reference to FIG. 4.

The layer API 280 provides an interface between the layers in the network stack 254 and the kernel firewall engine 256. Through the layer API 280, the requesting layer issues the classification request to the kernel firewall engine 256. The classification request includes the packet as received by requesting layer, the packet context as received by the requesting layer, and layer parameters. The layer parameters are packet parameters processed by, e.g. added or parsed, by the requesting layer. As a specific example, source and destination Internet Protocol (IP) addresses are layer parameters sent by the network layer 272 when implementing the IP protocol. Layer parameters may also include information beyond the packet parameters that are added to or parsed from the packet. As a specific example, the layer parameters include a local address type. The local address type is determined by the IP layer and sent as part of the classification request. Local address types include unicast, broadcast, multicast, anycast and the like. A specific implementation of the layer API 280 is described with reference to FIG. 6.

Optionally, the callouts 258 are used to implement added functionality beyond the permit and block filter actions. A callout is executed when the kernel firewall engine 256 identifies a matching filter for the packet that includes, as the associated action, a callout to one of the callout modules. The kernel firewall engine sends the classification request as issued by the requesting layer, i.e. full packet, layer parameters, and packet context, to the callout module, along with an identification of the matching filter, via the callout API 284. In an embodiment of the invention, the firewall architecture includes a base set of callouts 258. Additional callouts, like layers, are added as needed to the extensible firewall architecture. A specific implementation of the callout API 284 is described with reference to FIG. 6.

The user mode process 250 includes a second firewall engine referred to as a user firewall engine 260 and one or more policy providers 262 identified as "PP1," "PP2," and "PP3." The policy providers 262 are processes that add firewall policy, i.e. installed filters 282, into the firewall architecture. Any process is used to accomplish this task. An example is a legacy IPSec policy service (LIPS). The legacy IPSec policy service adds filters defining network traffic that is supposed to use IPSec protocols such as Encapsulating Security Protocol (ESP) and Authentication Header Protocol (AH). As a specific example, the legacy IPSec policy adds a firewall policy indicating that all unsolicited inbound packets must be encrypted according to the ESP protocol. The policy further provides that any unsolicited inbound packet in clear text, i.e. an unencrypted packet, should be blocked. The policy providers 262 obtain the policy from any suitable source such as data in volatile or nonvolatile memory, or a Graphical User Interface (GUI) that permits an administrator or system users to directly enter policy. The user firewall engine 260 converts the policy into a new filter, i.e. defines the policy in terms of filter conditions and associated actions, and adds the new filter into the set of installed filters 282.

The user firewall engine 260 also performs filter arbitration and conflict resolution functions. When the policy provider 262 provides new policy to the user mode firewall engine 260, the user firewall engine determines whether the new filter resulting from the new policy conflicts with any of the installed filters 282. An example of a method of identifying and resolving conflicts that is suitable for use in the framework of the present invention is described in United States Patent Application entitled "Method for Managing Network Filter Based Policy," Ser. No. 10/456,433.

The architecture further includes a filter engine API 266 that forms an interface between the user mode firewall engine 260 and the kernel firewall engine 256. The filter engine API 266 provides a mechanism for the user firewall engine 260 to add new filters to or remove existing filters from the set of installed filters 282, and to examine installed filters 282 so that filter conflicts can be detected and resolved. A management API 290, accessible by policy providers 262, also provides a mechanism to add and remove filters from the architecture.

The user mode firewall engine 260 also includes a filter module 294. The filter module 294 is an instance of the kernel firewall engine 256 in the user mode 250. The instance of the filter module 294 in the user mode firewall engine 260 permits the user firewall engine 260 to replicate the services of the kernel firewall engine 256 for one or more user mode layer processes referred to herein as user mode layers 282. The user mode layers 282 are added in the same way that kernel mode layers are created. Because the filter module 294 is the user mode instance of the kernel firewall engine 256, it will be understood that any functionality described herein for the kernel firewall engine 256 also applies to the filter module 294.

A keying module API 288 provides an interface between the user policy engine 260 and keying module 296. The keying module API 288 is used to signal the keying module of the need to establish an SA.

The firewall architecture includes a boot time policy 286 and a failsafe policy 264. The boot time policy 286 and the failsafe policy 264 are implemented to provide a basic set of installed filters 282 while the system is in a transitional state such as when the network device is initialized, e.g. turned on, reset, or restarted. During the transitional state, there is a latent period during which the user mode 250 is not established and it is not possible to install filters via policy providers 262 and the user firewall engine 260. As a result, the network device is vulnerable to malicious attacks from, for example, unsolicited inbound packets. The boot time policy 286 resides in the kernel mode 252 and is loaded into the kernel firewall engine 256 prior to the time the user mode 250 is established. The boot time policy 296 provides the basic installed filter 282 configurable to provide any suitable filter conditions and associated actions for protecting the system during the transitional state. An example of the boot time policy 286 is one that blocks all inbound and outbound network packets.

Once the user mode 250 is established, the transitional state continues while the policy providers 262 are identifying policy and attempting to add installed filters 282 into the kernel firewall engine 256. When the user mode 250 is established, the user firewall engine 260 first loads the fail-safe policy 264 into the kernel firewall engine 256 before any policy is accepted by the policy providers 262. The boot time policy 286 is then disabled. Like the boot time policy 286, the fail-safe policy 264 is a basic filter designed to protect the system from attacks during the transitional state when the policy providers and user firewall engine are still in the process of installing filters. Once the policy providers 262 successfully install their respective filters into the network device, the fail-safe policy 264 is disabled.

Figures 4, 5:
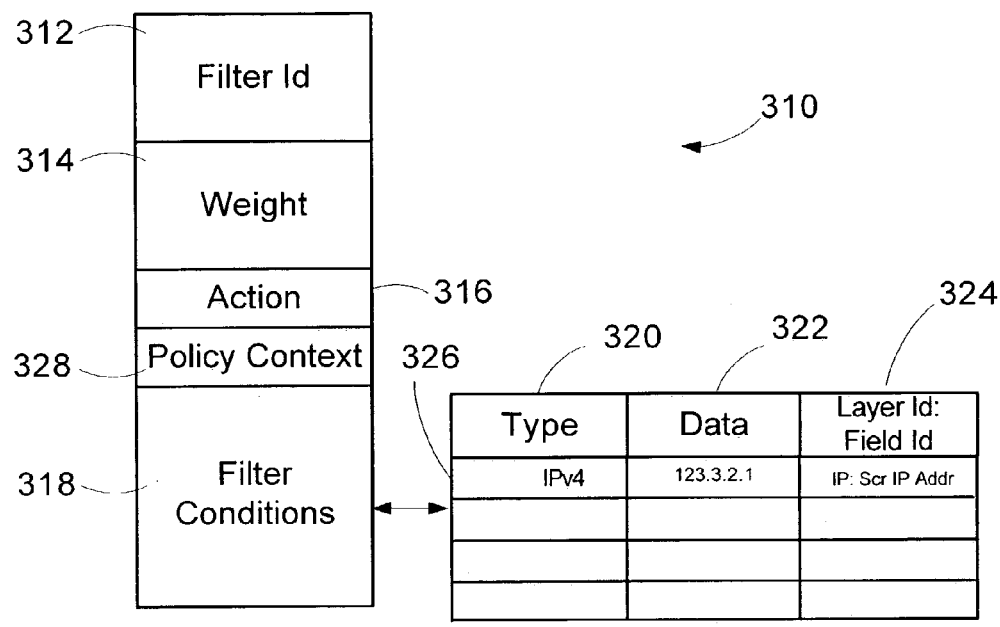
FIG. 4 is a block diagram illustrating an exemplary filter used with the present invention.
FIG. 5 is a block diagram illustrating an exemplary data structure for packet context used with the present invention.

Referring to FIG. 4, the set of installed filters 282 will now be described. Each filter 310 of the set of installed filters 282 has a plurality of fields including a filter Id 312, a weight 314, one or more actions 316, a policy context 328, and a set of filter conditions 318. The filter Id 312 provides a unique identification to the filter. The filter Id 312 is used, for example, as a means for the kernel firewall engine 256 to return matching filter information to the user firewall engine 260 and the callouts 258. In an embodiment of the invention, the filter is assigned to one of the layers in the network stack 254. The filter Id 312 is used by the kernel firewall engine 256 to track which filter is assigned to which layer.

The weight field 314 includes a value that identifies priority of the filter 310. The higher the value in the weight field 314, the higher the priority of the filter. The filter priority determines the order whereby matching filters are applied to the packet by the kernel firewall engine 256.

In an embodiment of the invention, the filter with the highest priority, i.e. highest weight value, is applied first, then the next highest priority filter is applied and so on, until a matching filter with a terminating action is encountered. Terminating actions are described in more detail below. Once the matching filter with the terminating action is applied, the kernel firewall engine 256 stops applying matching filters. Thus, the action 316 specified by lower priority matching filters are not taken on the packet after the terminating action is applied. Alternatively, the firewall engine 256 identifies a single matching filter and returns a set of actions from the single matching filter.

The set of filter conditions 318 determine whether a packet matches the filter 310. Each filter condition 318 includes a type 320, data 322, and a layer Id:field Id 324. The type 320 defines the length and number of variables included in the corresponding data 322. The architecture provides for predefined known variable types such as Byte, Short, Long, 8 Bytes, String, Internet Protocol version 4 (IPv4) Address, Internet Protocol version 6 (IPv6) Address, IPv4 Address plus Mask, IPv6 Address plus Mask, and Address Range.

The data field 322 includes data matching the type. For example, if the type is IPv4 Address, an acceptable value for the data field 322 is a 32-bit number in range of 00.00.00.00 to 255.255.255.255 as expressed in dotted decimal notation. In some instances, the type 320 provides for multiple values in the data field 322. The Address Range, IPv4 Address plus Mask, and IPv6 Address plus mask types allow two IP address values, defining a beginning and ending range of IP addresses. For maximum flexibility, the architecture also permits user-defined types. Alternatively, additional types are manually added to the system architecture.

The layer Id:field Id 324 is used to identify an originating layer and a parameter from the originating layer, respectively. The originating layer and the parameter from the originating layer define packet parameters, i.e. layer parameters and packet context that the data 322 is compared against when identifying matching filters. The originating layer identifies a layer in the network stack. The parameter from the originating layer identifies a specific parameter associated with the originating layer. A specific example is illustrated by filter condition 326. The type is IPv4 thereby indicating the data 322 is a 32-bit IP address. The layer Id is "IP" representing that the 32 bit number is an IP, i.e. network, layer parameter. The field Id is "Src IP Addr" which in the example represents a source IP address. The IP address provided in the data field 322 is "123.3.2.1" indicating that any packet with that source IP address meets the filter condition thereby matching the filter. The filter 310 may include multiple filter conditions 318, in which case a packet matches the filter 310 only if all filter conditions are met.

The action 316 in the filter 310 is permit, block, or callout. If the action 324 in the filter 310 is permit or block and the packet matches the filter 310, the permit or block action is returned to the requesting layer by the kernel firewall engine 256. If the action 316 is callout, the kernel firewall engine 256 issues its own classification request that includes the full packet, layer parameters, context and identification of the matching filter to the designated callout module 258. The callout module 258 performs its programmed function on the packet, e.g. intrusion detection. The callout may return an action (either permit, block) to the kernel firewall engine, which in turn relays the action to the requesting layer. The callout is also capable of maintaining packet context that is likewise returned to the requesting layer via the kernel firewall engine 256. The action may also be a value, such as a null value, indicating that no firewall policy exists.

Actions are designated terminating or non-terminating. If the action is terminating, once that action is identified for a packet, the action is returned to the requesting layer and no additional filters are applied to the packet. If the action is non-terminating, additional filter lookups continue until a terminating action for the packet is identified. As a default, permit and block are designated terminating actions.

The policy context 328 is used to store policy other than firewall policy, such as security policy or QOS policy. The policy context is any suitable data structure. For example, the policy context is a 64 bit number that is interpreted by a process that added the policy context. The policy context and/or action may be a null value.

FIG. 5 illustrates an example of a data structure 330 used for the packet context that is maintained by, and passed to, the layers in the network stack 254 and the callout modules 258. The packet context 330 follows the inbound or outbound network packet as it traverses the layers and includes one or more entries, labeled 336-340. Each entry includes a layer Id:field Id 332 and a corresponding value 334.

The layer Id:field Id 332 has the same meaning as the layer Id:field Id 324 provided as part of the filter conditions 318 in the filters 310 (FIG. 4). Namely, the layer Id:field Id 322 identifies the originating layer and the layer parameter from the originating layer for the data in the value field 334. The value field 334 includes a specific layer parameter.

As a specific example, entry 336 includes the layer Id:field Id 332 "NDIS: Src. MAC Addr." "NDIS" represents a Network Driver Interface Specification implementation of the Link layer 274 (FIG. 1). "Src MAC addr." represents a source MAC address. Thus, the layer:field Id 332 indicates that the data in the value field 334 is a source MAC address that was processed by the NDIS (Link) layer. The value field 334 includes the actual source MAC address which in the example is "00.08.74.4F.22.E5" as expressed in hexadecimal notation.

As a second example, entry 338 has a layer Id:field Id 332 of "NDIS:IF No." This again identifies the layer as NDIS, but in this case identifies the parameter as "IF No" representing an interface number as the specific NDIS parameter. The value field 334 includes the actual interface number, which in this case is 2.

As a third example, entry 340 has a layer Id:field Id 332 of "IP:Dst IP Addr." The "IP" represents the network layer using the IP protocol and the "Dst IP Addr" represents a destination IP address as the IP layer parameter. The value field 334 includes the actual destination IP address of "123.3.2.1."

Figure 6:
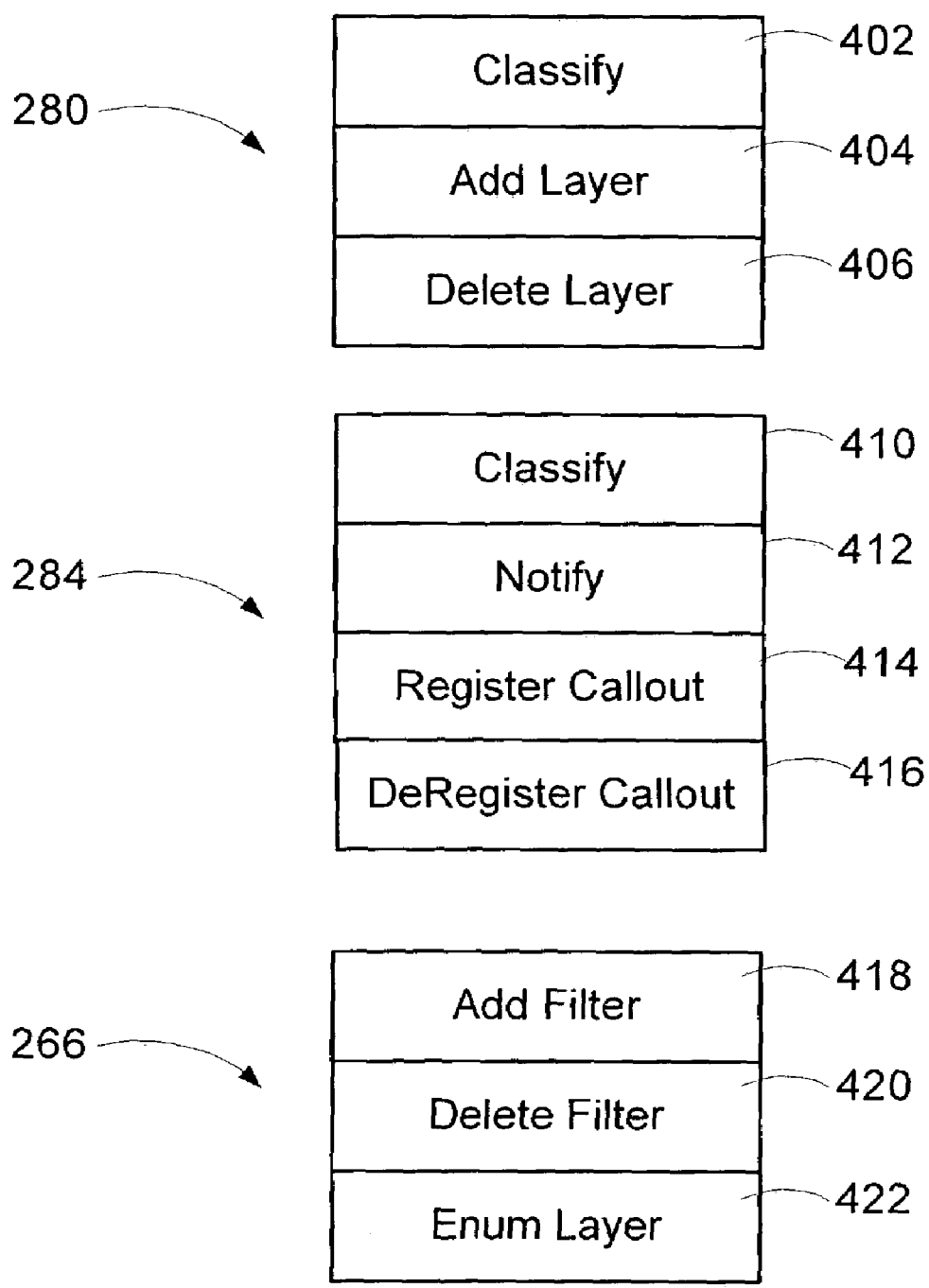
FIG. 6 is a block diagram illustrating an exemplary set of application programming interfaces used with the present invention.
Figure 7:
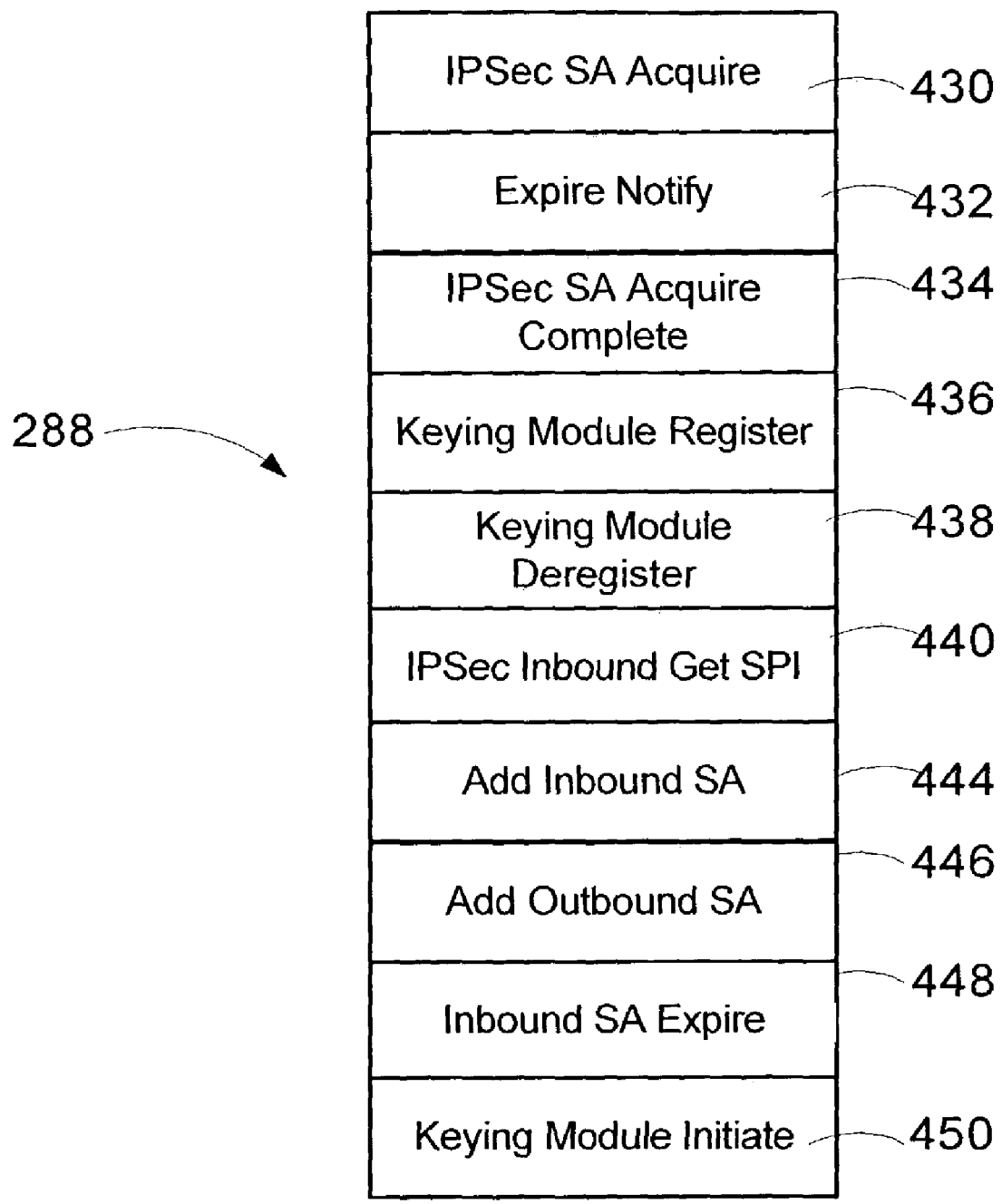
FIG. 7 is a block diagram illustrating an exemplary application programming interface used with the present invention.

Having described the underlying firewall architecture of the present invention, attention is drawn to the functional interfaces of the system and exemplary methods that are performed using the underlying firewall architecture described herein. The functional interfaces are implemented as a plurality of application programming interfaces (APIs). The APIs include the layer API 280, the callout API 284, the filter engine API 266, and the keying module API 288 as shown in FIG. 6 and FIG. 7.

The layer API 280 facilitates data exchange between each of the layers in the network stack 254 and the kernel firewall engine 256. As shown, the layer API 280 includes a Classify method 402, an Add Layer method 404, and a Delete Layer method 406. The layer API 280 may also execute within the filter module 294 to facilitate communication between the user mode layers and the filter module 294.

The Classify method 402 is used by the requesting layer to send layer parameters, the packet as received by the requesting, and the packet context to the kernel firewall engine 256. The kernel firewall engine 256 compares the (1) layer parameters from the requesting layer and (2) packet context entries to the filter conditions 318 in each filter 310 assigned to the requesting layer to identify matching filters. The following is an exemplary implementation of the Classify method. It will be understood that the following methods are described as receiving or returning data values. According to known programming techniques, the methods may use pointers to data values instead of actual data values.

```
NTSTATUS
WFPClassify
(
    IN ULONG                        LayerId,
    IN WFP_INCOMING_VALUES*         pInFixedValues,
    IN WFP_INCOMING_CONTEXT_VALUE*  pInContext,
    PVOID                           pPacket,
    OUT WFP_ACTION_TYPE*            pActionType,
    OUT UINT64*                     pOutContext
);
```

Where the following characterizes the recited parameters.

LayerId identifies the network layer issuing the classification request, i.e. the requesting layer. Referring to FIG. 3, the Layer Id identifies the layer as the data stream layer 268, the transport layer 270, the network layer 272 or the link layer 274. Other layers are valid if added to the system. For example, if the SMB layer 276 is added, it has its own unique identification. The firewall architecture of the present invention further permits multiple protocol implementations at a layer in the network stack 254. For example the stack has two transport layers 270, a first transport layer uses the TCP protocol and a second transport layer uses the UDP protocol. User mode layers 282 may also be added thereby forming a valid layer.

pInFixedValues includes a subset of the layer parameters processed by the requesting layer. The pInFixedValues, along with the packet context entries, are compared to the filter conditions to determine if the packet matches the filter. An example of default layer parameters included in the pInFixedValues for each layer are identified in Table A below. It will be understood that the following values are exemplary only as an advantage of the architecture is that it allows the layers to use any values accessible to that layer.

TABLE A

| Layer | Default Layer Parameters |
| --- | --- |
| Link Layer | Source and Destination MAC Addresses; Interface Number |
| Network Layer | Source and Destination IP Addresses; Protocol Type; Local Address Type |
| Transport Layer | Source and Destination Port Numbers; |
| Application | Deciphered application layer protocol payload | pInContext includes the context data structure 330 (FIG. 5) as received by the requesting layer. The packet context is used by the kernel firewall engine 256 in conjunction with the layer parameters to identify matching packets.

pPacket includes the entire packet as received by the requesting layer. The pPacket is not used by the kernel firewall engine 256 to identify matching filters. As previously described, the kernel firewall engine 256 uses the pInFixedValues and pInContext to identify matching filters. The pPacket is included in the Classify method so that the kernel firewall engine 256 can send it to one or more callout modules 258 identified as the action 316 in matching filters.

pActionType includes the action 316 that is returned to the requesting layer. The action 316 returned is permit or block as identified in the matching filter, or callout modules executed by the matching filter.

pOutContext includes the policy context data. As previously described, the policy context is used to facilitate network policies associated with IPSec, QOS and any other non-firewall filter based policy.

The Add Layer 404 and Delete Layer 406 methods are used to add and remove a layer from the firewall architecture, respectively. The following is an exemplary form of the Add Layer 404 method.

NTSTATUS

AddExtensionLayer(OUT PULONG pLayerId);

Where the following characterizes the recited parameters.

pLayerId is a unique layer identification value returned to the layer being added, i.e. the layer executing the Add Layer method.

The following is an exemplary form of the Delete Layer 406 method.

NTSTATUS

RemoveExtensionLayer(ULONG LayerId);

Where the following characterizes the recited parameters.

LayerId identifies the layer being removed; i.e. the layer executing the Delete Layer method.

The Callout API 284 facilitates data exchange between the kernel firewall engine 256 and the callouts 258. The Callout API 284 includes a Classify method 410, a Notify method 412, a Register Callout method 414, and a Deregister Callout method 416. The Classify method 410 of the Callout API 284 is similar to the Classify method 402 of the Layer API 280 except that it also includes matching filter data. The following is an exemplary form of the Classify method 410 used to execute a callout.

```
typedef NTSTATUS
(*WFP_CALLOUT_CLASSIFY_FN)
(
    IN const WFP_INCOMING_VALUES*      fixedValues,
    IN WFP_INCOMING_CONTEXT_VALUE*     wfpContext,
    IN VOID*                           packet,
    IN WFP_FILTER*                     matchedFilter,
    OUT WFP_ACTION_TYPE*               action,
    OUT UINT64*                        outContext
);
```

Where the following characterizes the recited parameters.

fixedValues includes the layer parameters sent from the requesting layer. The fixedValues is the same data provided by the requesting layer in pInFixedValues data sent as part of the Classify method 402 in the layer API 280.

wfpContext includes the context data structure 330 (FIG. 5). This data is the same as sent by the requesting layer in the pInContext sent as part of the Classify method 402 in the layer API 280.

packet includes the entire packet as received by the requesting layer. This data is the same as sent by the requesting layer in the pPacket sent as part of the Classify method 402 in the layer API 280.

matchedFilter identifies the filter requesting the callout. Typically, the matching filter is identified by the filter Id 312 of the matching filter 310 initiating the Classify method 410 of the callout API 284.

pActionType includes the action that is returned to the kernel firewall engine 256 from the callout 258. If the pActionType is permit or block, it is returned to the requesting layer as the pActionType returned by the Layer API 280. The callout can also return a continue action that instructs the kernel firewall engine 256 to continue applying matching filters to the packet.

pOutContext includes the policy context data, such as security or QOS policy data.

The Notify method 412 is used to notify a callout when a filter 310 is added or deleted to the set of installed filters 282 that identifies as one of its actions 316, the callout module 258. The notify provides the callout with an opportunity to take any required action such as allocating or de-allocating buffers that will be used by the callout 258 when it is executed by the kernel firewall engine 256. The following is an exemplary form of the Notify method.

```
typedef NTSTATUS (*WFP_CALLOUT_NOTIFY_FN)
(
    IN WFP_NOTIFY_ENUM      notify,
    IN WFP_FILTER*          filter
);
```

Where the following characterizes the recited parameters.

notify includes a numerical value that indicates whether the filter is being added or deleted. For example, a value of 1 indicates the filter is being added and a value of 2 indicates that the filter is being deleted.

filter identifies the filter being added or deleted by unique value. This may be accomplished by providing the filter Id 312 included as part of the filter 310.

The callout Registration method 414 and callout Deregistration 416 method are used to add and remove callout modules, respectively. An exemplary form the registration method 414 is as follows:

```
NTSTATUS WfpRegisterCallout
(
    IN const GUID*              calloutId,
    IN const WFP_CALLOUT*       callout,
    IN const SECURITY_DESCRIPTOR*   sd
);
```

Where the following characterizes the recited parameters.

callout Id provides a unique identification for the registering callout module.

callout provides any callout specific information such as a driver service name, device name, and pointers to the callout classify and notify functions.

sd provides a security descriptor for the callout. The security descriptor provides an access control list (ACL) that specifies which processes can modify and delete the callout.

An exemplary form of the callout deregistration method 416 is as follows:

```
NTSTATUS WfpDeregisterCallout
(
    IN const GUID*          calloutId
);
```

Where the following characterizes the recited parameters.

callout Id is the unique Id of the callout to be removed.

The filter engine API 266 facilitates data exchange between the user mode firewall engine 260 and the kernel mode firewall 256 engine. As shown, the management API 266 includes an Add Filter method 418, a Delete Filter method 420, and an Enum Layer method 422. The methods of the filter engine API 266 are also provided as part of the management API 290.

The Add Filter 418 and Delete Filter 418 methods are used to add a new filter to the set of installed filters 282 and to delete an existing filter from the set of installed filters 282, respectively. The following is an exemplary form of the Add Filter method 418.

```
NTSTATUS
AddFilterToLayer
(
    ULONG           LayerId,
    WFP_FILTER*     pFilter
);
```

Where the following characterizes the recited parameters.

LayerId identifies the layer that the filter is assigned to.

pFilter is the filter 310 being added to the set of installed filters 282.

The following is an exemplary form of the Delete Filter method 420.

```
NTSTATUS
DeleteFilterFromLayer
(
    ULONG       LayerId,
    ULONG       FilterId
);
```

Where the following characterizes the recited parameters.

LayerId identifies the layer that the filter is assigned to.

pFilter is the filter being deleted from the set of installed filters.

The Enum Layer method 422 provides a mechanism for the user firewall engine 260 to identify all filters matching a set of criteria. This allows the filter engine API to identify conflicting filters for filter arbitration and conflict resolution. The following is an exemplary form of the Enum Layer method 422.

```
LayerStartEnum
(
    PWFP_ENUM_TEMPLATE      pEnumTemplate,
    OUT PULONG              pMatchCount,
    OUT PWFP_ENUM_HANDLE    pEnumHandle
)
```

Wherein the following characterizes the recited parameters.

pEnumTemplate includes a data structure defining the filters that should be returned. Fore example, it include parameters that the filter conditions must match for the filter to be returned.

pMatchCount includes the number of filter matches based on the specified pEnumTemplate.

pEnumHanlde includes a reference to the matched filter entries.

The keying module API 288 provides an interface between keying modules and the user firewall engine 260. The keying module API 288 includes an IPSec SA Acquire method 430, an Expire Notify method 432, and an IPSec SA Acquire Complete method 434, a Keying Module Register method 436, a Keying Module Deregister method 438, an IPSec Inbound Get SPI method 440, an Add Inbound SA method 444, an Add Outbound SA method 446, an Inbound SA Expire 448 method, and a Keying Module Initiate method 350. The keying module API 288 may also include the methods previously described for the layer API, such as a Classify method 402, an Add Layer method 404 and a Delete Layer method 406.

The keying module API is used to facilitate use of known security protocols, such as defined by IPSec, used by an initiating computer and a responding computer. IPSec includes protocols such as AH and ESP. The ESP protocol is an authenticating and encrypting protocol that uses cryptographic mechanisms to provide integrity, source authentication, and confidentiality of data. The AH protocol is an authentication protocol that uses a hash signature in the packet header to validate the integrity of the packet data and authenticity of the sender.

An IKE protocol provides a method for an initiating computer and a responding computer to negotiate security settings used with the AH and ESP protocols. The negotiated security settings form a data structure called a security association (SA). The SA defines parameters such as an authentication algorithm, encryption algorithm, keys, and the lifetime of keys, used by ESP or AH to protect the contents of an IP packet. Because ESP and AH require an established SA, an IKE negotiation is executed before the ESP or AH protocols are used by the initiating and responding computer. A given SA is identified by a value known as a Security Parameter Index (SPI).

Each of the initiating and responding computers include an IPSec driver that determines, based on an IPSec policy, whether data sent between the initiating and responding computers requires encryption or authentication. The IPSec policy is a set of filters that defines how the network device uses IPSec and includes filter lists, authentication methods, and other information. In an embodiment of the invention, the IPSec policy is defined by filters included in the set of installed filters in the kernel firewall engine or the filter module 294. The policy that applies to a packet is identified by invoking the keying module layer which uses the Classify method to identify matching filters.

The IPSec SA Acquire method 430 is called by the user firewall engine 260 (via a client proxy) to pass a driver acquire or an external initiate request a user mode layer 282 implemented as a keying module layer. The keying module layer returns this call and does the negotiation asynchronously. Once the keying module layer has completed the negotiation, the keying module layer calls the IPSec SA Acquire Complete method 343 to notify the user policy engine 260 that the negotiation is complete. The following is an exemplary form of the IPSec SA Acquire method.

```
typedef WIN32_ERR (*PROCESS_IPSEC_SA_ACQUIRE0)
(
    IN FWP_IPSEC_ACQUIRE_CONTEXT0    ipsecContext,
    IN const FWP_IPSEC_SA_ACQUIRE0*  acquire,
    IN FWP_IPSEC_SPI                 inboundSAspi
);
```

Wherein the following characterizes the recited parameters.

ipsecContext is a handle to link the acquire with the SA being added.

acquire includes the necessary information for negotiating the SA according to known protocols such as IKE.

inboundSAspi includes a SPI that is used for an inbound SA.

The Expire Notify method 432 is called to pass an expire-notify to the keying module layer that added the inbound SA. The following is an exemplary form the Expire Notify method.

```
typedef VOID (*PROCESS_IPSEC_SA_EXPIRE0)
(
    IN const FWP_IPSEC_SA_EXPIRE_NOTIFY0* expireNotify
);
```

Wherein the following characterizes the recited parameters.

expireNotify contains information identifying the expiring SA. For example, in the case of an outbound SA, the SPI is provided.

The IPSec SA Acquire Complete 434 method is called by a keying module layer to close the user firewall engine's context after it has finished negotiation and added all the SAs, or after it has come across an error. After this method is executed, the keying module layer does not reuse the ipsecContext for any other API method. The following is an exemplary form the IPSec SA Acquire Complete method.

```
WIN32_ERR
FwpIPSecSAAcquireComplete0
(
    IN FWPM_ENGINE_HANDLE            engineHandle,
    IN FWP_IPSEC_ACQUIRE_CONTEXT0    ipsecContext,
    IN const FWP_IPSEC_NEGOTIATION_  status
    STATUS0*
);
```

Wherein the following characterizes the recited parameters.

engineHandle provides a handle to the user firewall engine 260.

ipsecContext is the context passed by user firewall engine with the IPSec Acquire method.

status provides status and other details of the SA negotiation. The status is returned by the user firewall engine 260 if the acquire was externally initiated via FwpKeyingModuleInitiate0.

The Keying Module Register method 436 is called by a keying module layer to register with the user firewall engine 260 and pass its function pointers. The following is an exemplary form of the Keying Module Register method.

```
WIN32_ERR
FwpKeyingModuleRegister0
(
    IN FWPM_ENGINE_HANDLE            engineHandle,
    IN const GUID*                   keyingModuleID,
    IN const FWP_KEYING_MODULE_TNFO0* keymodInfo
);
```

Wherein the following characterizes the recited parameters.

engineHandle provides the handle to the user firewall engine 260.

keyingModuleID is a unique ID for the keying module layer.

keymodInfo includes registration information about the keying module layer such as pointers to process IPSec SA Acquire and process IPSec SA Expire functions.

The Keying Module Deregister method 438 is called by the keying module layer to deregister the keying module from the user firewall engine 260. The following is an exemplary form of the Keying Module Deregister method.

```
WIN32_ERR
FwpKeyingModuleDeregister0
(
    IN FWPM_ENGINE_HANDLE       engineHandle,
    IN const GUID*               keyingModuleID
);
```

Wherein the following characterizes the recited parameters.

engineHandle is the handle to the user firewall engine 260.

keyingModuleID is the unique ID of the keying module layer.

The IPSec Inbound Get SPI method 440 is called by the keying module layer to obtain the SPI for a new inbound SA. The IPSec Inbound Get SPI method 440 is usually used when the keying module layer executes in a responding network device. The following is an exemplary form the IPSec Inbound Get SPI method.

```
WIN32_ERR
FwpIPSecSAInboundGetSpi0
(
    IN FWPM_ENGINE_HANDLE          engineHandle,
    IN const FWP_IPSEC_TRAFFIC0*   ipsecTrafficDescription,
    IN const FWP_IPSEC_UDP_ENCAP0* udpEncapInfo,
    OUT FWP_IPSEC_SPI*             inboundSpi
);
```

Wherein the following characterizes the recited parameters.

engineHandle is the handle to the user firewall engine 260.

ipsecTrafficDescription is a 5-tuple description for creating an inbound larval SA. The 5-tuple includes source and destination IP addresses, source and destination ports, and transport layer protocol type.

udpEncapInfo is UDP encapsulation data for creating the larval SA. UDP encapsulation is a known method of embedding a packet formatted according to a security protocol into an unencrypted UDP packet.

inboundSpi is the SPI for the inbound SA.

The Add Inbound SA method 444 is called by the keying module layer to add an inbound SA, i.e. update the larval SA. The user firewall engine 260 uses the SPI in the SA to map this call to its internal state, and ioctl the SA down to the IPSec driver. The following is an exemplary form of the Add Inbound SA method.

```
WIN32_ERR
FwpIPSecSAInboundAdd0
(
    IN FWPM_ENGINE_HANDLE          engineHandle,
    IN const FWP_IPSEC_SA_STRUCT0* inboundSA
);
```

Wherein the following characterizes the recited parameters.

engineHandle in the handle to the user firewall engine 260.

inboundSA includes the inbound SA.

The Add Outbound SA 446 method is called by a keying module layer to add an outbound SA. The user firewall engine uses an inbound SPI parameter to map this call to its internal state, and ioctl the SA down to the IPSec driver. The following is an exemplary form the Add Outbound SA method.

```
WIN32_ERR
FwpIPSecSAOutboundAdd0
(
    IN FWPM_ENGINE_HANDLE          engineHandle,
    IN FWP_IPSEC_SPI               inboundSpi,
    IN const FWP_IPSEC_SA_STRUCT0* outboundSA
);
```

Wherein the following characterizes the recited parameters.

engineHandle is the handle to the user firewall engine 260.

inboundSpi is the SPI for the inbound SA, with which an outbound SA is paired.

outboundSA includes the outbound SA.

The Inbound SA Expire method 448 is called by the keying module layer to expire the inbound SA that was previously added. The following is an exemplary form the Inbound SA Expire method 448.

```
WIN32_ERR
FwpIPSecSAInboundExpire0
(
    IN FWPM_ENGINE_HANDLE          engineHandle,
    IN const FWP_IPSEC_SA_EXPIRE0* expire
);
```

Wherein the following characterizes the recited parameters.

engineHandle is the handle to the user firewall engine 260.

expire includes data for the SA to be expired.

The Keying Module Initiate method 450 is called by known external application like RAS, Winsock API, and the like to initiate the keying module layer and setup SAs before an application starts sending its network traffic. The user firewall engine 260 asynchronously pends the RPC call, gets the SPI from an IPSec driver, and passes the acquire to the appropriate keying module. Once the keying module layer calls FwpIPSecSAAcquireComplete0, the user firewall engine completes the asynchronous RPC with the negotiation status. The following is an exemplary form of the Keying Module Initiate method.

```
WIN32_ERR
FwpKeyingModuleInitiate0
(
    IN FWPM_ENGINE_HANDLE             engineHandle,
    IN const FWP_IPSEC_SA_ACQUIRE0*   acquire,
    IN HANDLE                         waitEvent,
    OUT FWP_IPSEC_NEGOTIATION_STATUS0* negotiationStatus
);
```

Wherein the following characterizes the recited parameters.

engineHandle is the handle to the user firewall engine 260.

acquire includes data necessary for negotiating an SA.

waitEvent is a handle to an event that is triggered when negotiation status is available. If a client, i.e. calling external application, is not interested in waiting for the negotiation to complete, it can set this parameter to NULL. Internally the client proxy optionally passes this event to RPC and request it to set the event once the asynchronous RPC call completes.

negotiationStatus includes an outcome of the negotiation. The negotiationStatus is NULL if waitEvent is NULL. Otherwise negotiationStatus remains valid until the waitEvent is triggered.

Figure 8:
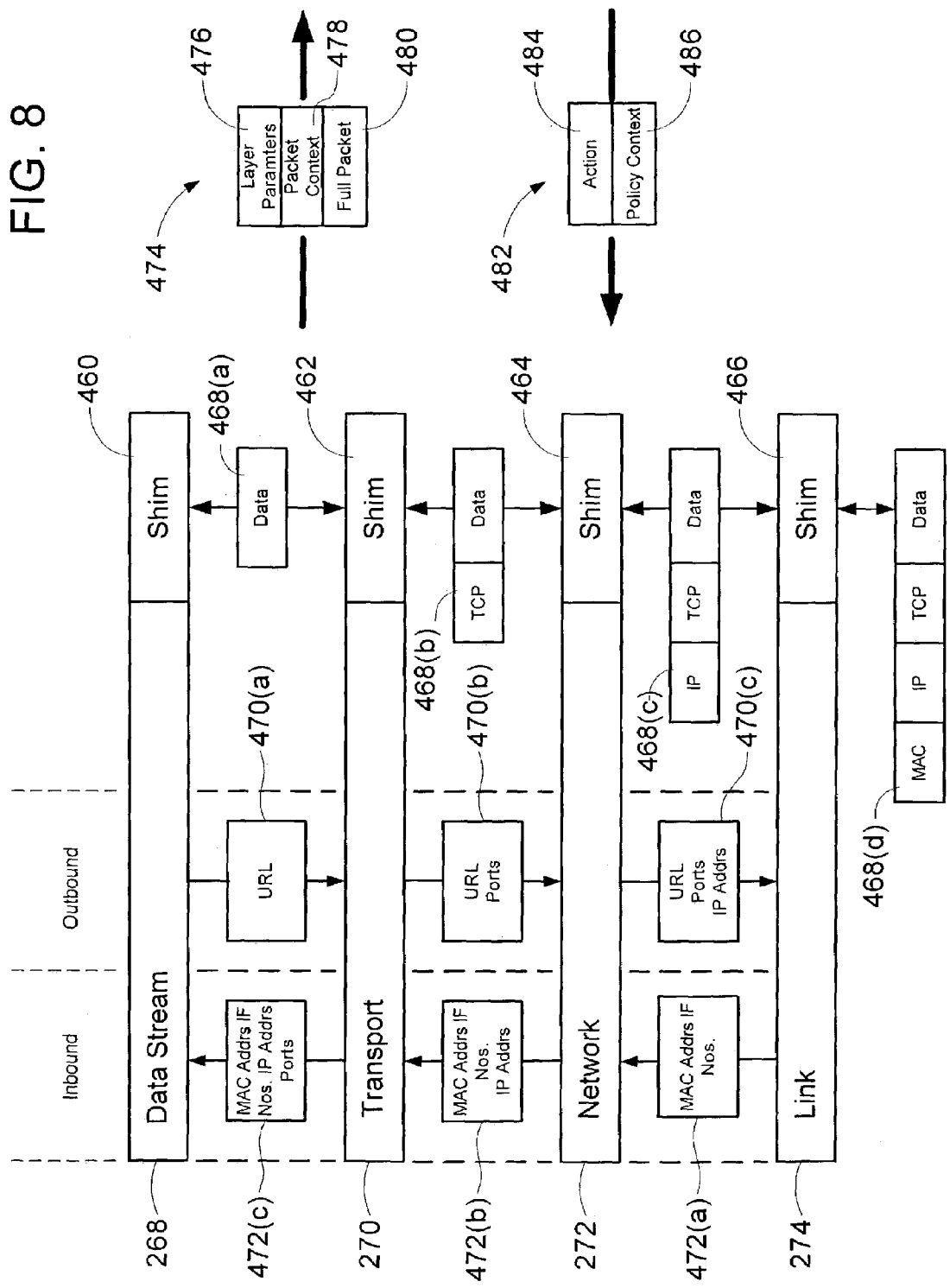
FIG. 8 is a block diagram illustrating functions performed by network layers according to the present invention.

FIG. 8 illustrates the methods used by the layers in the network stack 254 according to the present invention. The method illustrated in FIG. 8 may also be used by one or more user mode layers 282 in concert with the filter module 294 and the user firewall engine 260.

Each layer is capable of a plurality of functions including processing network packets, issuing classification requests to the kernel firewall engine 256, and managing packet context. In an embodiment of the invention, the functions are executed at each of the layers in a shim 460, 462, 464, 466 installed in the network stack 254. Alternatively, the functionality is directly built into the individual layers without the need for the shims.

The network stack 254 includes the data stream layer 268, the transport layer 270, the network layer 272, and the link layer 274. For the purposes of illustrating the present invention, the link layer 274 is implemented as a NDIS driver, the network layer 272 is implemented as an IP layer, the transport layer 270 is implemented as a TCP layer, and the data stream layer 268 is implemented as a HTTP layer. It will be understood that layers may be implemented according to any protocol. For example the transport layer also accommodates a User Datagram Protocol (UDP). The application layer supports File Transfer Protocol (FTP), Remote Procedure Call (RPC), Simple Mail Transfer Protocol (SMTP), Server Master Block (SMB) etc. As previously described, additional layers can be added to the architecture and layers may be deleted. For example, layers are added and deleted using the Add Layer and Delete Layer methods described with reference to FIG. 6.

A network packet, labeled 468(a)-(d), illustrates the network packet as it traverses and is processed by the layers in the network stack 254. If the packet 468(a)-(d) is an inbound packet, it traverses the network stack from bottom to top. If the packet 468(a)-(d) is an outbound packet, it traverses the network stack from top to bottom. While such processing is well known, it is briefly described for the purpose of illustrating the present invention.

Assuming an application executing in a network device, such as a web browser, initiates a request for contents of a web page located on another network device, the application issues the request to the data stream layer 268. In the example, the data stream 264 formats the request according to the HTTP protocol and sends the request to the transport layer in packet 468(a). The transport layer 270 receives packet 468(a). The transport layer 270, which implements the TCP protocol, places the data in one or more packets, and each packet is provided with a TCP header. The TCP header includes information such as the source and destination ports, protocol type, i.e. TCP, sequence numbers, flags, and checksums. The transport layer then sends the packet, labeled 468(b) to the network layer.

The network layer implements the IP protocol and encapsulates the data within an IP header that includes the source and destination IP addresses, flags, checksums and other known information. The IP header also indicates whether the packet is fragmented. A packet is fragmented when the size of the IP packet exceeds a Maximum Transmission Unit (MTU) size for the network technology used to transmit the packet. For example, Ethernet technology specifies that the MTU is 1500 bytes. If the IP packet length exceeds the MTU, it is fragmented into two or more IP packets, each with its own IP header, all of equal or smaller length as compared to the MTU.

In an embodiment of the invention, the network layer is divided into first and second layers. The first layer, referred to as a fragment layer, processes IP packet fragments. The second layer, referred to as a fully assembled layer, processes full IP packets, e.g. before outbound IP packets are fragmented and after inbound IP packets are reassembled into a single IP packet. Following network layer processing and possible fragmentation, the packet 468(c) is sent to the link layer 274. The link layer 274 further packetizes the data by providing a MAC header, with the source and destination MAC addresses, as well as other information. The packet is then sent to a network interface card (NIC) where it is physically transmitted onto the network.

Inbound packets are processed in a reciprocal fashion. Packet 468(d) is received by the NIC and sent to the link layer 274. The MAC header is removed and the packet 468(c) is sent to the network layer where the IP packet fragments are reassembled, if necessary, and the IP header is parsed. The network layer then sends the packet 468(b) to the transport layer where the TCP header is removed and if the data stream was sent in a plurality of TCP packets, the data stream is reassembled. Finally, the data stream 468(a) is sent to the data stream layer 268 where the data is deciphered by the application protocol, in this case the HTTP protocol.

For each outbound packet, the layers of the network stack maintain packet context 470(a)-(c). For each inbound packet, the layers of the network stack maintain packet context 472(a)-(c). The packet context follows each packet as it traverses the network layers. Packet context is also passed to, and may be modified by, the callouts 258 (FIG. 1).

The packet context is updated as the packets are processed at each layer. Each layer adds its layer parameters to the packet context thereby providing this information to subsequent layers or processes. As shown, the link layer 274 adds source and destination MAC addresses and an interface number for an inbound packet as illustrated by context 472(a). That context is received by the network layer 272, which adds source and destination IP addresses as illustrated by context 472(b). The transport layer 266 receives the context and adds the port numbers as illustrated by context 472(a).

A similar process occurs for the context 470(a)-(c) associated with outbound packets. The data stream layer 268 adds information such as a URL address from the packet payload as illustrated by context 470(a), the transport layer 270 further adds source and destination port numbers as illustrated by context 470(b) and the network layer adds source and destination IP addresses as illustrated by context 470(c).

It will be understand that each layer can add any context information available to that layer. Typically, this includes any information that the layer is designed to process, i.e. add or parse or otherwise derive from packets.

When the packet and its corresponding context are received at each layer, the layer functions as a requesting layer by identifying the layer parameters and sending a classification request, labeled 474. The classification request 474 includes, the layer parameters 476, the packet context 478 received from the prior layer, and the full packet 480. An exemplary method used to issue the classification request is the Classify method 402 described with reference to the layer API 280 (FIG. 7).

In response to each classify request, the kernel mode firewall engine 256 compares the layer parameters 476 and packet context 478 to the filter conditions 318 (FIG. 4) of the filters assigned to the requesting layer. The kernel firewall engine 256 sends a response, labeled 482, with the action 484 from the matching filters 310 with the highest weight 314 to the requesting layer. The kernel firewall engine 256 also returns the policy context 482. If no matching filters are identified by the kernel firewall engine 256, the kernel firewall engine notifies the requesting layer that no matching filters exist. The kernel firewall engine 256 continues to identify matching filters until a matching filter designates a terminating action, i.e. permit or block, or until all filters assigned to the requesting layer are checked, whichever comes first. Alternatively, the kernel firewall engine 256 identifies all matches and returns the actions to the requesting layer in a single response.

As generally illustrated, identifying layer parameters is done as part of the normal layer processing performed by the layers of the network stack 254. Additional packet parsing is not required thereby minimizing impact on system performance. Moreover, because the layers cooperate in maintaining packet context, it is possible to for the firewall engine 256 to compare filter conditions with packet parameters at layers that normally do not have access to those packet parameters. For example, the network layer 268 receives context for inbound packets from the link layer 274 that includes source and destination MAC addresses. Because the network layer 272 issues classification requests with network layer parameters, e.g. source and destination IP addresses, as well as the packet context, the kernel firewall engine 256 can filter on both IP and MAC addresses at the network layer 272 even though the MAC addresses are usually not available.

Figure 9:
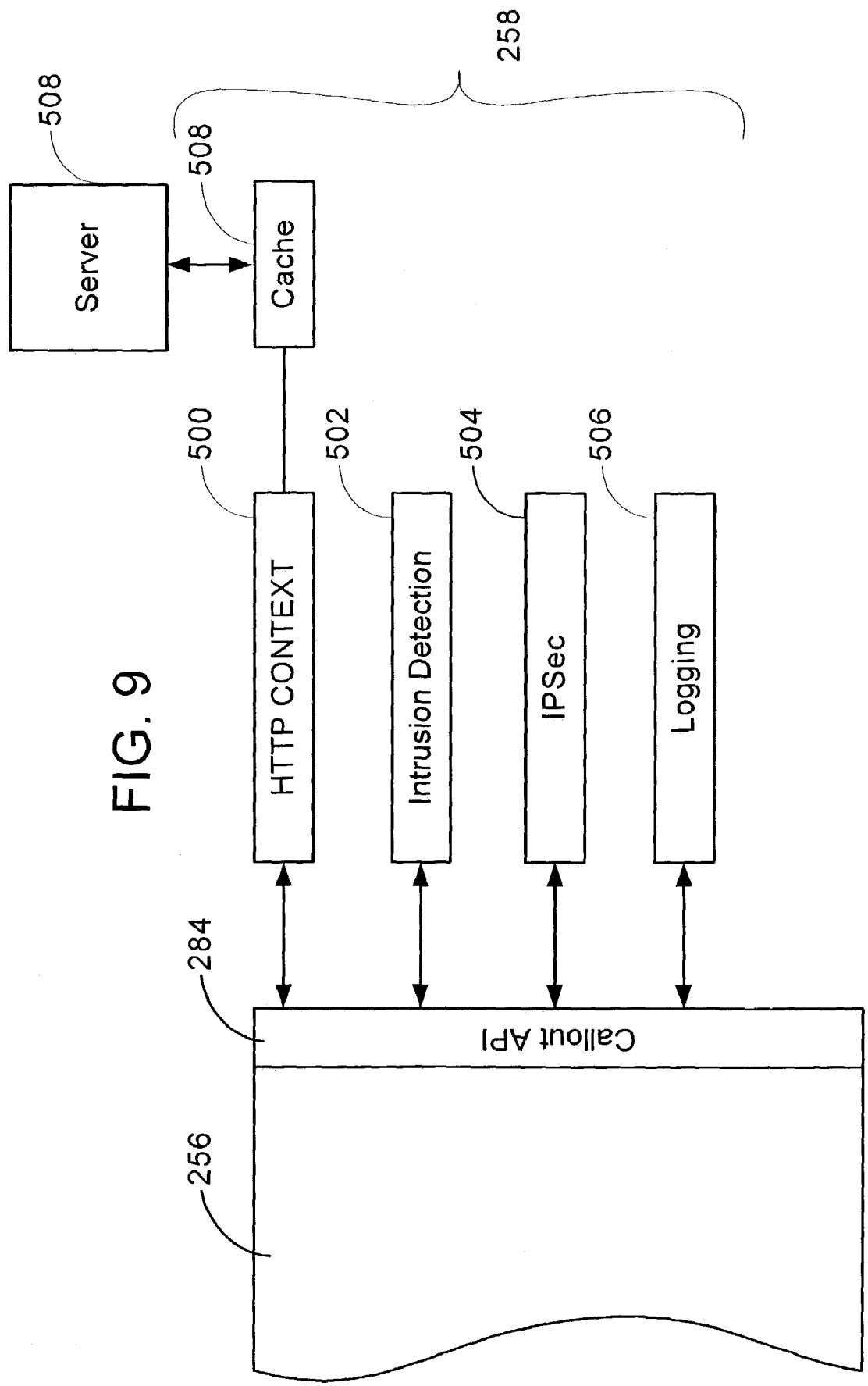
FIG. 9 is a block diagram illustrating an exemplary set of callouts used with the present invention.

Referring to FIG. 9 and exemplary set of callout modules 258 included with the firewall architecture of the present invention will now be described. The callout modules 258 include HTTP context callout 500, intrusion detection callout 502, IPSec callout 504, and logging callout 506. The callout API 284 forms the interface between the kernel firewall engine 256 and the callouts 258.

The HTTP context callout 500 maintains a cache 508 of acceptable, or alternatively, unacceptable URL addresses. The HTTP context callout 508 periodically accesses a server 510 interfaced to the public network that maintains URL addresses and classifies them as acceptable or unacceptable. When the kernel firewall engine 256 executes the HTTP context callout, the callout examines the packet, deciphers the URL address if necessary, and determines if it is acceptable based on information in the cache 508. The HTTP callout then returns permit as the action 316 if the URL address is acceptable and block if the URL address is unacceptable to the kernel mode firewall engine 256, which in turn returns the action 316 to the requesting layer via layer API 280. The HTTP context callout is useful in implementing a parental control function.

The intrusion detection callout 502 uses available algorithms and techniques to examine the packet to identify indicia of viruses or otherwise suspicious packets. If a suspicious packet is detected, an action 316 of block is returned. An example of a suspicious packet is a packet where all flags in IP and TCP headers are set to a value of one. The packet is suspicious because it is never valid and could indicate an attack signature. Alternatively, the intrusion detection callout 502 modifies packet context to flag the suspicious nature of the packet thereby deferring a decision on whether to block the packet to subsequent layers in the network stack.

The IPSec callout 504 is designed to determine to whether a proper security protocol was applied to the packet. The IPSec callout 504 communicates with an IPSec process and determines based on IPSec policy whether the packet was supposed to be subject to IPSec processing. If so, the IPSec callout 504 verifies, based on packet context, whether the packet was in fact subject to the IPSec processing. If the packet was supposed to be processed according to IPSec, but was not, e.g. the packet was in clear text, an action of block is returned. If the packet was subject to IPSec processing, the IPSec callout verifies that a proper Security Association (SA) was applied. If the proper SA was not applied, the callout returns an action 316 of block, otherwise an action 316 of permit is returned. Alternatively, the IPSec callout modifies the packet context deferring a decision on whether to block or permit the permit to a subsequent layer.

The logging callout 506 is used to save information pertaining to the packet, such as the full packet for later use. Such later use might be, for example, diagnostics for certain network traffic that is unexpectedly not traversing the network because it is being blocked or for tracking malicious attacks on the system.

All of the references cited herein, including are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A firewall framework implemented within a computer system for providing multi-layering filtering of a packet, comprising:

a set of layer processors, wherein each layer processor in the set is associated with a respective layer within a protocol stack, each layer processor being capable of processing layer parameters for the packet being processed by the layer processor and each layer processor being further capable of forming a requesting layer that receives a packet context from another layer processor, issues a classification request that includes the layer parameters, the packet and the packet context, and modifies the packet context by adding the layer parameters; and a first firewall engine of a kernel mode including:
    a layer interface for receiving the classification request from the requesting layer and for returning an action to the requesting layer,
    a set of installed filters, and
    a lookup component for identifying at least one matching filter from the set of installed filters and identifying from the matching filter the action to be returned by the layer interface; and a second firewall engine of a user mode including:
    a filter module for replicating filtering of the packet by the first firewall engine for at least one layer processor of the user mode and installing a new filter to the set of installed filters.

2. The firewall framework of claim 1, wherein the lookup component further uses the packet context for identifying the at least one matching filter.

3. The firewall framework of claim 2, wherein the firewall engine further comprises:
a callout interface for sending the layer parameters, the packet context, and the packet to a callout, wherein the callout analyzes the packet and returns the action to the firewall engine.

4. The firewall framework of claim 2, wherein the requesting layer passes the packet context to a next layer.

5. The firewall framework of claim 1 of the user mode, further comprising:
a policy provider for establishing the new filter.

6. The firewall framework of claim 1, wherein each of the installed filters comprises:
a filter condition including a type-data pair, the type defining the size of the data and the data including a filter parameter, and the action.

7. The firewall framework of claim 6, wherein the filter parameter includes a range of values.

8. The firewall framework of claim 6, wherein the filter comprises a weight factor defining a priority of the filter.

9. The firewall framework of claim 1, wherein the set of layer processors further comprises:
a link layer having layer parameters including an interface number and source and destination MAC addresses;
an network layer having layer parameters including a source and destination IP address;
a transport layer having layer parameters including source and destination ports; and
an application layer having layer parameters including a stream of data.

10. The firewall framework of claim 9, wherein the network layer is further divided into a fragment layer and a fully assembled layer, the fragment layer processing IP packet fragments and the frilly assembled layer processing complete IP packets, each of the fragment layer and the fully assembled layer issuing the classify request.

11. The firewall framework of claim 1, wherein the set of layer processors of the kernel mode includes an application layer having layer parameters.

12. The firewall framework of claim 1, wherein the first firewall engine executes in an operating system user mode.

13. A method of communicating between a first layer process and a firewall process in an operating system, comprising the steps of:
selecting a first layer process and a firewall process of a kernel mode of the operating system, wherein communication between the first layer process and the firewall process of the kernel mode is replicated by communication between a first layer process and a firewall process of a user mode of the operating system;
issuing, by the first layer process, a classify call having a plurality of parameters comprising a protocol packet, at least one layer parameter, and a packet context received from a second layer process;
receiving, by the firewall process of the kernel mode, the classify call;
identifying, by the firewall process of the kernel mode, at least one matching filter from a set of installed filters, wherein filters are installed to the set of installed filters by the firewall process of the user mode, wherein the firewall process of the kernel mode uses the at least one layer parameter and the packet context to identify the at least one matching filter, and wherein the packet context includes at least one entry including a layer identification field identifying the first layer process and the at least one layer parameter, and a value including the at least one layer parameter; and
issuing, by the firewall process of the kernel mode, an action identified from the at least one matching filter using the at least one layer parameter.

14. The method of claim 13, wherein the first layer process is a new process, further comprising:
issuing, by the first layer process, an add layer call.

15. The method of claim 13, wherein the first layer process is an existing process, further comprising:
issuing, by the first layer process, a delete layer call.

16. A method of communicating between a firewall process and a callout process in an operating system, comprising the steps of:
selecting a firewall process and a callout process of a kernel mode of the operating system;
issuing, by the firewall process of the kernel mode, a classify call having a plurality of parameters comprising a protocol packet, at least one layer parameter, a packet context, and a matching filter identification, wherein the matching filter is identified from a set of filters installed by a firewall process of a user mode of the operating system, and wherein the packet context includes at least one entry including a layer identification field identifying the firewall process and the at least one layer parameter, and a value including the at least one layer parameter;
receiving, by the callout process, the classify call;
performing, by the callout process, a programmed function on the protocol packet; and
issuing, by the callout process, an action identified from the plurality of parameters in the classify call.

17. The method of claim 16, wherein the callout process is a parental control module maintaining a cache of acceptable resource location, further comprising:
examining the packet to identify a resource location and comparing the resource location to the acceptable locations.

18. The method of claim 17, wherein the action issued by the callout process is block and the protocol packet is prevented from network traversal.

19. The method of claim 17, wherein the action issued by the callout process is permit and the protocol packet is permitted to further traverse the network.

20. The method of claim 16, wherein the callout process is a logging module, further comprising storing in a memory the protocol packet.

21. The method of claim 16, wherein the callout process is a security module, further comprising:
determining, by the security module, that the protocol packet is required to conform to a security protocol;
verifying that the protocol packet conforms to the security protocol.

22. The method of claim 21, wherein the security protocol is an IPSec security protocol.

23. A computer-readable medium encoded with computer-readable instructions for facilitating a firewall framework implemented within a computer system for providing multi-layering filtering of a packet, comprising:
a set of layer processors, wherein each layer processor in the set is associated with a respective layer within a protocol stack, each layer processor being capable of processing layer parameters for the packet being processed by the layer processor and each layer processor being further capable of forming a requesting layer that receives a packet context from a previous layer processor, issues a classification request that includes the layer parameters, the packet and the packet context, and modifies the packet context by adding the layer parameters; and a first firewall engine of an operating system kernel mode including:
  a layer interface for receiving the classification request from the requesting layer and for returning an action to the requesting layer,
  a set of installed filters, and
  a lookup component for identifying at least one matching filter from the set of installed filters and identifying from the matching filter the action to be returned by the layer interface; and a second firewall engine of an operating system user mode including:
  a filter module for replicating filtering of the packet by the first firewall engine for at least one layer processor of the operating system user mode and installing a new filter to the set of installed filters.

24. The computer-readable medium of claim 23, wherein the lookup component further uses the packet context for identifying the at least one matching filter.

25. The computer-readable medium of claim 24, wherein the firewall engine further comprises:
  a callout interface for sending the first layer parameters, the packet context, and the packet to a callout, wherein the callout analyzes the packet and returns the action to the firewall engine.

26. The computer-readable medium of claim 24, wherein the requesting layer passes the packet context to a next layer.

27. The computer-readable medium of claim 23, further comprising:
  a policy provider for establishing the new filter.

28. A computer-readable medium encoded with computer-readable instructions for communicating between a first layer process and a firewall process in an operating system, comprising the steps of:
  selecting a first layer process and a firewall process of a kernel mode of the operating system, wherein communication between the first layer process and the firewall process of the kernel mode is replicated by communication between a first layer process and a firewall process of a user mode of the operating system;
  issuing, by the first layer process, a classify call having a plurality of parameters comprising a protocol packet, at least one layer parameter, and a packet context received from a second layer process;
  receiving, by the firewall process of the kernel mode, the classify call;
  identifying, by the firewall process of the kernel mode, at least one matching filter from a set of installed filters, wherein filters are installed to the set of installed filters by the firewall process of the user mode, wherein the firewall process of the kernel mode uses the at least one layer parameter and the packet context to identify the at least one matching filter, and wherein the packet context includes at least one entry including a layer identification field identifying the first layer process and the at least one layer parameter, and a value including the at least one layer parameter; and
  issuing, by the firewall process of the kernel mode, an action identified from the at least one matching filter using the at least one layer parameter.

29. The computer-readable medium of claim 28, wherein the first layer process is a new process, further comprising:
  issuing, by the first layer process, an add layer call.

30. The computer-readable medium of claim 28, wherein the first layer process is an existing process, further comprising:
  issuing, by the first layer process, a delete layer call.

31. A computer-readable medium encoded with computer-executable instructions for communicating between a firewall process and a callout process in an operating system, comprising the steps of:
  selecting a firewall process and a callout process of a kernel mode of the operating system;
  issuing, by the firewall process of the kernel mode, a classify call having a plurality of parameters comprising a protocol packet, at least one layer parameter, a packet context, and a matching filter identification, wherein the matching filter is identified from a set of filters installed by a firewall process of a user mode of the operating system, and wherein the packet context includes at least one entry including a layer identification field identifying the firewall process and the at least one layer parameter, and a value including the at least one layer parameter;
  receiving, by the callout process, the classify call;
  performing, by the callout process, a programmed function on the protocol packet; and
  issuing, by the callout process, an action identified from the plurality of parameters in the classify call.

32. The computer-readable medium of claim 31, wherein the callout process is a logging module, further comprising storing in a memory the protocol packet.

33. The computer-readable medium of claim 31, wherein the callout process is an security module, further comprising:
  determining, by the security module, that the protocol packet is required to conform to a security protocol;
  verifying that the protocol packet conforms to the security protocol.

34. A functional interface implemented as at least one layer interface and/or at least one callout interface for allowing a requesting layer to obtain a policy for a packet, either directly from a firewall engine or from a callout through the firewall engine, the requesting layer being one of a plurality of layers within a protocol stack, comprising a classify method, comprising:
  the packet received by the requesting layer;
  a set of parameters associated with the packet, the set of parameters including data processed by the requesting layer;
  a packet context received by the requesting layer from another layer of the plurality of layers, wherein the packet context includes at least one entry including a layer identification field identifying the another layer and at least one parameter from the set of parameters, and a value including at least one parameter from the set of parameters; and
  an action to be returned to the requesting layer identifying a first policy to be applied to the packet, wherein the action is returned by the firewall engine comprising a firewall engine of a kernel mode of an operating system and/or a firewall engine of a user mode of the operating system, and wherein the policy is identified from a set of filters installed by the firewall process of the user mode.

35. The functional interface of claim 34, further comprising:
an add layer method for allowing a new layer to be added to the plurality of layers.

36. The functional interface of claim 34, further comprising:
a delete layer method for removing an existing layer from the plurality of layers.

37. The functional interface of claim 34, further comprising:
a policy context defining a second policy to be applied to the packet.

38. The functional interface of claim 37, wherein the first policy is a firewall policy and the second policy is a non-firewall policy.

* * * * *

UNITED STATES PATENT AND TRADEMARK OFFICE
CERTIFICATE OF CORRECTION

| | | |
|---|---|---|
| PATENT NO. | : 7,509,673 B2 | Page 1 of 1 |
| APPLICATION NO. | : 10/456766 | |
| DATED | : March 24, 2009 | |
| INVENTOR(S) | : Brian D. Swander et al. | |

It is certified that error appears in the above-identified patent and that said Letters Patent is hereby corrected as shown below:

In the Claims:

In column 27, line 34, in Claim 10, delete "frilly" and insert -- fully --, therefor.

Signed and Sealed this
Nineteenth Day of April, 2011

David J. Kappos
*Director of the United States Patent and Trademark Office*